(12) United States Patent
Yang et al.

(10) Patent No.: US 11,880,612 B2
(45) Date of Patent: Jan. 23, 2024

(54) PERSONALIZE USER INTERFACE

(71) Applicant: Hewlett-Packard Development Company, L.P., Spring, TX (US)

(72) Inventors: Joseph Yang, Boise, ID (US); Roger S. Twede, Boise, ID (US); Deny Joao Correa Azzolin, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/635,396

(22) PCT Filed: Oct. 4, 2019

(86) PCT No.: PCT/US2019/054782
§ 371 (c)(1),
(2) Date: Feb. 15, 2022

(87) PCT Pub. No.: WO2021/066842
PCT Pub. Date: Apr. 8, 2021

(65) Prior Publication Data
US 2022/0291877 A1    Sep. 15, 2022

(51) Int. Cl.
*G06F 3/12*     (2006.01)
*H04M 1/72409*  (2021.01)
*H04M 1/72412*  (2021.01)

(52) U.S. Cl.
CPC .......... *G06F 3/1204* (2013.01); *G06F 3/1222* (2013.01); *G06F 3/1253* (2013.01); *G06F 3/1292* (2013.01); *H04M 1/72409* (2021.01); *H04M 1/72412* (2021.01)

(58) Field of Classification Search
None
See application file for complete search history.

(56) References Cited

U.S. PATENT DOCUMENTS

| | | |
|---|---|---|
| 6,976,032 B1 | 12/2005 | Hull et al. |
| 7,177,915 B2 | 2/2007 | Kopchik |
| 9,348,990 B2 | 5/2016 | Chuaprasert et al. |
| 9,445,220 B2 | 9/2016 | Granbery |
| 9,794,443 B2 | 10/2017 | Su et al. |
| 10,148,633 B2 | 12/2018 | Suga |
| 2003/0038965 A1 | 2/2003 | Simpson et al. |
| 2008/0297829 A1* | 12/2008 | Paek ............... G03G 15/5091 358/1.15 |
| 2009/0116051 A1 | 5/2009 | Kasai |
| 2013/0208306 A1 | 8/2013 | Fukasawa |
| 2014/0070002 A1 | 3/2014 | Pineau et al. |
| 2014/0096029 A1 | 4/2014 | Schultz |

(Continued)

FOREIGN PATENT DOCUMENTS

KR    100677544    2/2007

*Primary Examiner* — Thomas D Lee
(74) *Attorney, Agent, or Firm* — Brooks, Cameron & Huebsch, PLLC (57) ABSTRACT

Generating personalized user interfaces includes receiving an indication of a user device in a proximity of an image forming device. Based on the user device, a system can determine a prediction of intent to use the image forming device by a user account associated with the user device and in response to determining the prediction is greater than a threshold, instructing the image forming device to provide an indicator corresponding to the user account.

16 Claims, 5 Drawing Sheets

(56) References Cited

U.S. PATENT DOCUMENTS

| | | |
|---|---|---|
| 2014/0100955 A1 | 4/2014 | Osotio et al. |
| 2014/0156792 A1 | 6/2014 | Roberts |
| 2014/0344446 A1 | 11/2014 | Rjeili et al. |
| 2016/0110782 A1 | 4/2016 | Tadajewski |
| 2017/0134609 A1 | 5/2017 | Park et al. |
| 2019/0215572 A1 | 7/2019 | Bagga |
| 2022/0214644 A1* | 7/2022 | Toda .................. H01Q 21/12 |

* cited by examiner

PERSONALIZE USER INTERFACE

BACKGROUND

Image forming apparatuses may provide capabilities for printing, scanning, copying, faxing or other functions. These functions may be activated locally or over a network by a user.

BRIEF DESCRIPTION OF THE DRAWINGS

Examples will now be described, by way of non-limiting example, with reference to the accompanying drawings, in which.

DETAILED DESCRIPTION

Image forming devices provide capabilities for printing, scanning, copying, faxing or other functions. These functions may be activated locally or over a network by a user. In addition, image forming devices can provide a user interface to enable users to interact with the image forming devices to select tasks to perform on those image forming devices. However, with additional functionality of image forming devices there are potentially additional capabilities to provide on the image forming devices.

Additionally, users may interact with image forming devices over a network from networked devices, such as personal computers, mobile devices, over network servers, or a combination of network connections. This increases the need for security between devices as well as secure delivery of documents to image forming devices.

Disclosed herein are systems to provide personalized user interfaces for users as well as improved security. In personalized user interfaces disclosed, rather than displaying a fixed login screen, image forming devices present a control panel to display lists of users that are dynamically populated based on nearby users that may attempt to use the device. In addition, the image forming devices may display personalized user preferences and setting to users that approach and use the device.

In some examples, systems may include mobile device components, image forming device components and image delivery components. As the user's mobile device is in proximity to an image forming device, the user's mobile device detects a beacon including device identification information. The device information, mobile information of the mobile device, and user information is transmitted to image delivery components. The image delivery components then analyze the information to determine a likelihood that the user will use the device. The likelihood may be determined based on previous user activity, current jobs of the user, proximity of the user, or the like.

Based on the likelihood of the user's intent, the image delivery components notify the image forming device of the user to display on the user interface. In some examples, the user's information may be displayed on the user interface in relation to other user's also in proximity to the image forming device. In some examples, the system identifies the user of the mobile device by providing the user-id, name, language, security policy, and location of the user.

In some examples, as a user device enters a proximity to image forming device, the user's mobile device containing an application detects a beacon from the image forming device, such as a Bluetooth beacon or other wireless signal. The beacon information including image forming device information user device information (for example, location), and user information (for example account information) is then transmitted to an image delivery system that authenticates the user device and notifies the image forming device of the nearby user. The image delivery system proceeds to identify the user of the mobile device and securely collects user-id, name, language, security policy, location, or other information associated with the user, and shares that with the image forming device. As the user approaches the image forming device, a front panel may then display a user interface including an option to identify as the user or to provide a personalized greeting or preset preferences to the user. As it is displayed, the user can then proceed to access the device based on the authentication or security policies of the system.

Examples are further described herein with respect to the figures below. The figures represent examples and should not be considered limiting, but rather example implementations. In various examples, systems and methods may include fewer or additional components than have been shown in the figures. The systems and processes are generally described with respect to image forming devices, but may similarly apply to other apparatus to provide personalized user interfaces to users. For example, various apparatus may include printers, copiers, thermostats, refrigerators, multifunction devices, three dimensional printers, or other apparatus providing display screens or other user interfaces for personalized user interactions.

Figure 1:
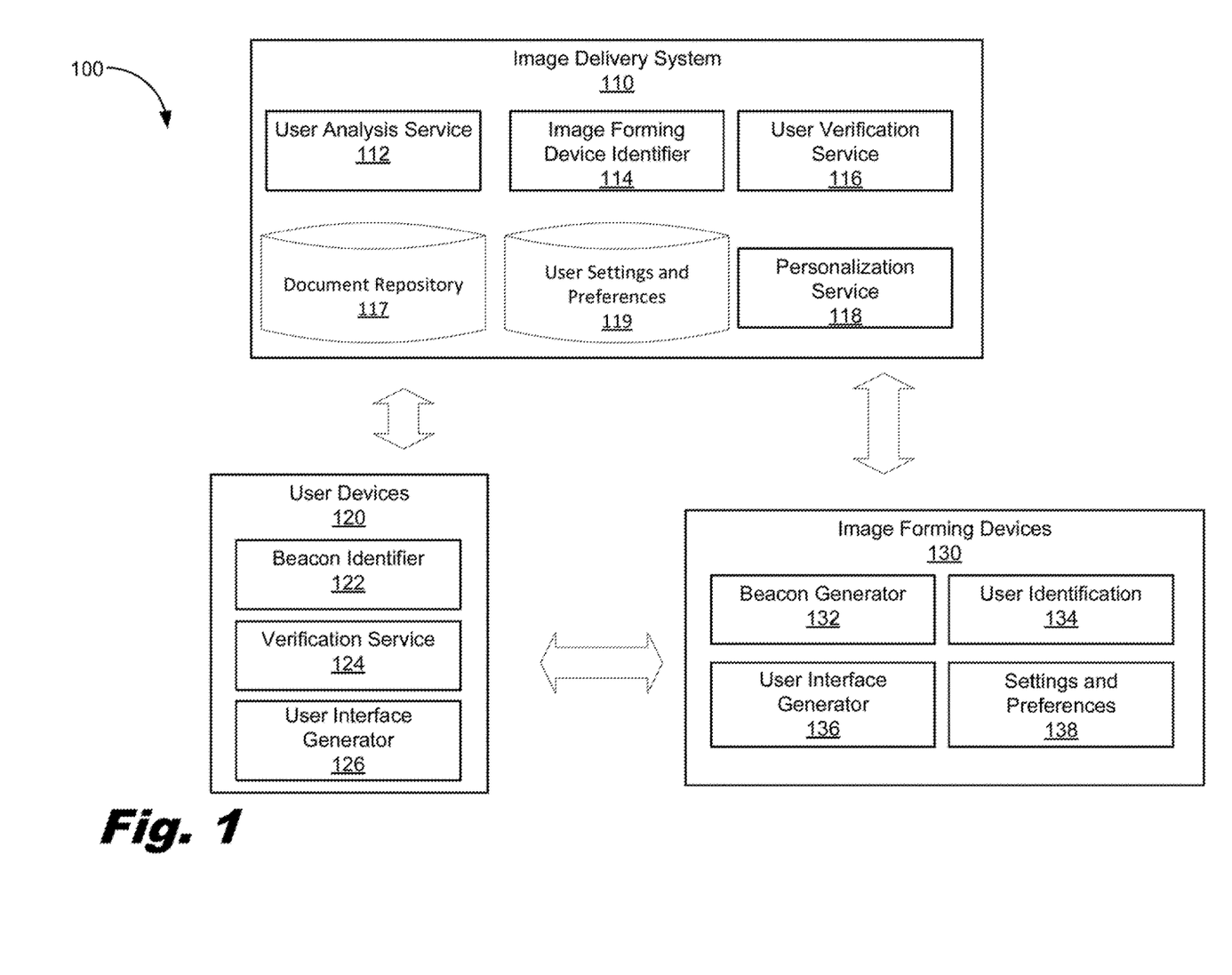
FIG. 1 illustrates a block diagram of an environment to provide personalized user interfaces on an image forming device according to examples.

FIG. 1 is a block diagram showing an environment 100 that includes an image delivery system 110, user devices 120, and image forming devices 130. The coordination of components in environment 100 enable a user of a user device 120 to approach an image forming device 130, such as a printer, and have the image forming device 130 identify the user and provide a personalized welcome screen with available actions and setting or preferences updated to reflect the user's typical usage and preferences. While the examples described with reference to FIG. 1 discuss processes and actions of components, in various implementations, these may be performed by other components. Furthermore, certain components may be further combined or separated from the examples illustrated in FIG. 1.

In some examples, user devices 120 may include portable devices such as a smartphone, tablet, or the like. The user devices 120 may include beacon identifier 122, verification service 124, and user interface generator 126. As the user device 120 approaches an image forming devices 130, the user device may receive a signal identifying the image forming apparatus 130. The signal may include a beacon, such as a Bluetooth beacon, WIFI signal, or other wireless transmission. The beacon identifier 122 may identify a token within the beacon that can be used to verify the image forming apparatus 130. In some examples, tokens may be updated periodically and the user device 120 may receive additional beacon signals from an image forming device 130. The user devices 120 may also receive beacons from multiple image forming device 130 and identify tokens from each. In some examples, the received signal may include additional information such as the device type, device identification, device location, or other information analyzed by user devices 120.

The user device 120 may also include verification service 124 to verify the user device 120 and connection to image forming devices 130. The verification service 124 may transmit a beacon as identified by beacon identifier 122 to image delivery system 110 for verification. The verification service 124 may include additional details of user device 120, such as a user identification associated with the user, a location of the user device 120, or additional data about the user device 120 or information received from image forming device 130. The verification service 124 may receive confirmation from the image delivery system 110 that the user device 120 and image forming device 130 have been authenticated.

In some examples, the user devices 120 also include a user interface generator 126. The user interface generator 126 can provide a user with interactive displays to enable actions by the user. For example, the user interface generator 126 may provide the user with a list of image forming devices 130, options to print, scan, fax, or otherwise process jobs at an image forming device 130. In some examples, the user interface generator 126 may request additional information from a user, such as account information or passwords, confirmation that the user intends to use an image forming device 130, or the like.

The image forming devices 130 may include a beacon generator 132, a user identifier 134, a user interface generator 136, and settings and preferences 138. The image forming devices 130 are described generally herein as multifunction printers but may include any appliance that provides secure connections to user devices 120. The image forming devices 130 may communicate with image delivery system 110 to receive data associated with users of user devices 120 as well as to authenticate user devices 120. The image forming devices 130 may also communicate with user devices 120 to verify the user.

The beacon generator 132 may generate and broadcast a beacon to be received by user devices 120 that enter into the vicinity of the image forming devices 130. For example, the beacon generator 132 may generate a beacon that includes a token identifying the image forming devices 130. In some examples, the beacon generator 132 may be part of the image delivery system 110 and the image forming devices 130 may receive and transmit a beacon without generating beacons themselves. In some examples, the beacon can also include a unique identification of the image forming devices 130. The image forming device 130 may also provide the beacon to image delivery system 110 to compare to beacon's provided by user devices 120.

The image forming devices 130 may also provide user identification 134. For example, the image forming device 130 and user device 120 may start a session after the beacon is identified and processed by the user device 120. The image forming devices 130 can then receive information from the user device 120 or the image delivery system 110 that identifies a user that is using the user device 120. In some examples, a user interface generator 136 may provide an interface showing the user names associated with the user devices 120 within a range of the image forming devices 130. In some examples, the user names may be displayed based on a variety of characteristics of the user or user devices 120. For example, a user's previous usage may be used to determine the likelihood that the user will interact with the image forming devices 130. Additional data such as distance from the image forming devices 130, pending jobs associated with the user, or the like may also be used to set a threshold for listing user names as well as ordering the user names to indicate that the users that are most likely to use the image forming devices 130 in more prominent positions of a user interface.

The image forming devices 130 may also use the user identified by user identifier 134 to preset settings and preferences 138 to those associated with the user. For example, the image forming devices 130 may set settings and preferences 138 including language of choice, personalized tasks, network documents, or pending actions. In various examples, additional settings or preferences 138 may be set by the image forming devices 130. In some examples, settings and preferences 138 may be stored for recent users of the image forming devices 130. The settings and preferences 138 may also be provided by a store of user settings and preferences 118 stored on the image delivery system 110 when a user is authenticated based on a received beacon.

User interface generator 136 generates a user interface to display on a display screen of the image forming device 130. For example, a first user interface may display particular user names for users that are within a proximity of an image forming device 130 or meet a threshold based on a predicted probability that a user intends to use the image forming device 130. In some examples, user interface generator 136 can also provide a user interface enabling tasks to be performed on the image forming devices 130. Examples of user interfaces that may be generated by user interface generator 136 are described further with references to FIGS. 2A-2C below.

Image delivery system 110 includes components to coordinate verification and authentication of user devices 120 as well as to provide information to image forming devices 130 to complete tasks requested by users of user devices 120. Image deliver system 110 may include user analysis service 112, image forming device identifier 114, user verification 116, personalization service 118, document repository 117 and user settings and preferences 119.

The image delivery system 110 may receive beacon information from user devices 120 that was received from the image forming devices 130. The user analysis service 112 may identify a user based on the received beacon information. The user device 120 may include a user identity, location information, proximity information of the user with respect to one or more image forming devices 130 associated with the beacon information. The user identification service may use the information to identify the user as well as one or more image forming devices 130.

The user analysis service 112 may also generate a prediction of a user's intent to use the image forming device. For example, user analysis service 112 may perform intent analysis of the user based on the user's location, usage history of the image forming device, or pending actions of the user. The user's location and proximity to one or more image forming devices 130 may indicate that the user intends to use one of those devices. If the proximity changes, the user analysis service 112 may also update the proximity and use the change in determining user intent. In some examples, the user analysis service 112 may analyze usage history of the image forming device 130 or of the user device 120 to determine the likelihood that a user is going to use an image forming device 130. For example, the user may use one of several image forming devices 130 within a workspace with more frequency than others. Therefore, the user analysis service 112 may predict a higher likelihood that the user is intending to use a particular image forming device 130 based on usage history. The user analysis service 112 may also retrieve a list of pending or past actions of a user and identify image forming devices 130 that are capable of performing those actions. For example, the user analysis service 112 may predict a higher intent to use an image forming device 130 that can print a particular size sheet of media based on a pending print job or that has scanning capabilities if the user frequently performs scanning actions.

The image forming device identifier 114 may identify an image forming device 130 based on the beacon information provided by the user devices 120. For example, the beacon information may provide a unique identifier that the image delivery system 110 uses to determine type, model, status, location, or other information of the image forming devices 130. In some examples, the image delivery system 110 may initiate a connection or session with the image forming device 130 in response to identification of the image forming devices 130. The device identification and corresponding image forming device 130 information may be provided to the user analysis service 112 as a component of predicting the intent of a user to use an image forming device 130. Furthermore, the image forming device identifier 114 may provide certain information to user verification service 116 to confirm that the user should be authorized to user image forming devices 130.

The user verification service 116 authenticates a user based on criteria from the user device 120 and the image forming devices 130. For example, the image forming device identification and the beacon provided to the user device 120 and shared with the image delivery system 110 may be compared to a current beacon that the image forming device 130 shares with the image delivery system. The beacon may be ephemeral and updated periodically, for example, every 30 seconds, 1 minute, or other amount of time that enables comparison of a beacon provided by the user device 120 and generated by image forming device 130. In some examples, the image delivery system 110 may store a log of a past several beacons broadcast by image forming devices 130 to provide verification in the case of a delay in transmission between components. The user verification service 116 may further compare other details for added security. For example, the image delivery system 110 may request a password, fingerprint, or other verification from user device 120 to indicate that the user is currently using an application related to image forming devices. Furthermore, the user verification service 116 may confirm that the location reported by a user device 120 is in the same area as that of image forming device 130 or perform other security analysis to authenticate the user device 120 for using the image forming device 130.

After a user is authenticated, the image delivery system 110 can generate personalize interface information to provide for use by user interface generator 136 of the image forming devices 130. For example, the personalization service 118 can retrieve information shared by the user device 120, such as collecting user-id, name, language, security policy, location information or the like. The image delivery system 110 may also include a document repository 117 and user settings and preferences 119. For example, the document repository 117 may include remotely stored documents associated with an account of the user of user device 120. A user of the image forming devices 130 can then operate a user interface to access and print or otherwise use such remotely stored documents at image forming device 130. User settings and preferences 119 may store preset settings and preferences associated with the user account. The personalization service 118 may package this information to provide to image forming device 130 to display to the user as a personalized user interface. For example, the user settings and preferences 119 may include security settings, language settings, duplex printing preferences, finishing preferences, color printing preferences, or other settings or preferences that enable personalization of a user interface on a display of image forming device 130.

The image delivery system 110 may compile a list of user devices 120 and associated user accounts to provide for display to the image forming devices 130. The list of accounts may be determined based on those with the highest predict likelihood of intent to use the image forming devices 130. For example, a number of users may be identified based on a threshold prediction of intent to use an image forming device 110. In some examples, the threshold may be a distance of a user device 120 from an image forming device 110, may be set as a maximum number of users to display, or may be based on a threshold prediction level. The image forming device 130 can then provide the list of names. In some examples, the list may be ordered based on the prediction of intent to use the image forming device 130 by each user. The user interface generator 136 can then provide a user interface listing the users as indicated by the image delivery system 110.

If a user selects an indication of their account from the user interface, the image forming device can use corresponding settings and preferences 138 to generate a personalized user interface for the user. For example, the user interface may include information about the user, provide certain actions associated with the user, provide access to remotely stored documents in the user's account, preset print settings, scan settings, finishing settings, or other settings associated with the image forming devices 130. In some examples, the image forming device 130 may provide a personalized user interface to a user without the user selecting an indication of the account. For example, the intent prediction may indicate to the image forming devices 130 to provide a personalized user interface rather than a list of potential user accounts. Example user interfaces are discussed further with reference to FIGS. 2A-2C.

Figure 2A:
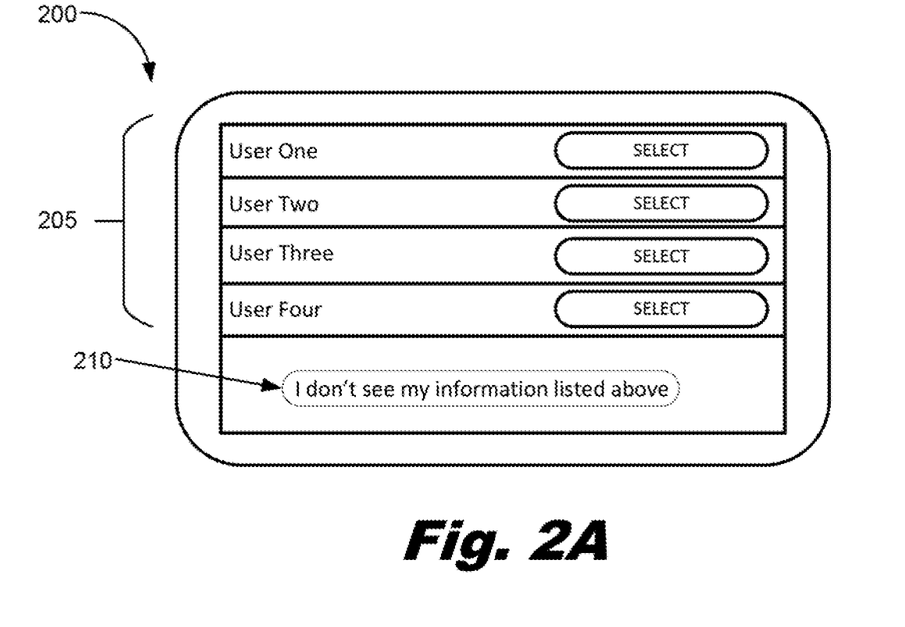
FIGS. 2A-2C illustrates example user interfaces generated by a personalized user interface system according to examples.
Figure 2B:
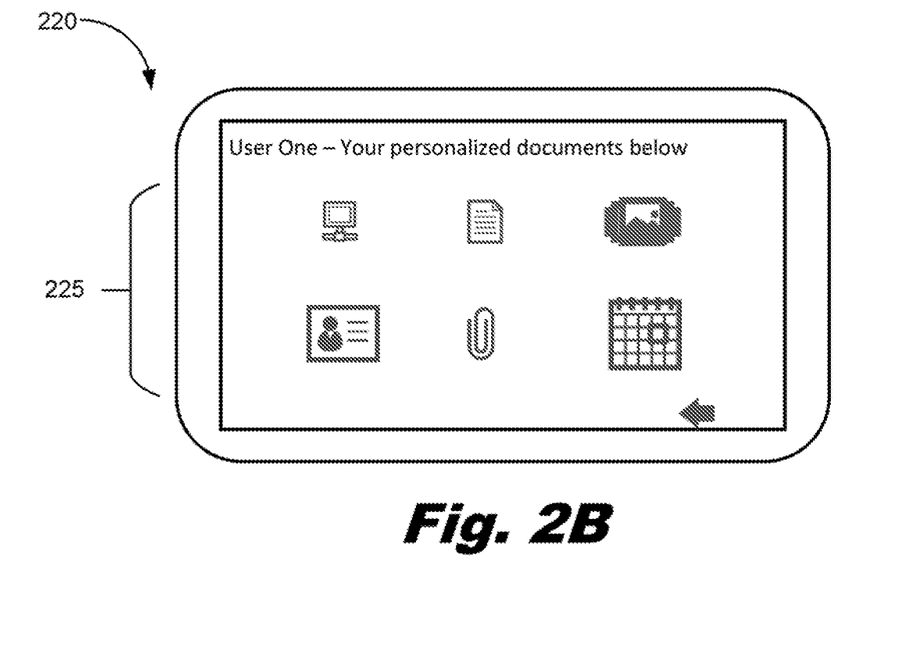
Figure 2C:
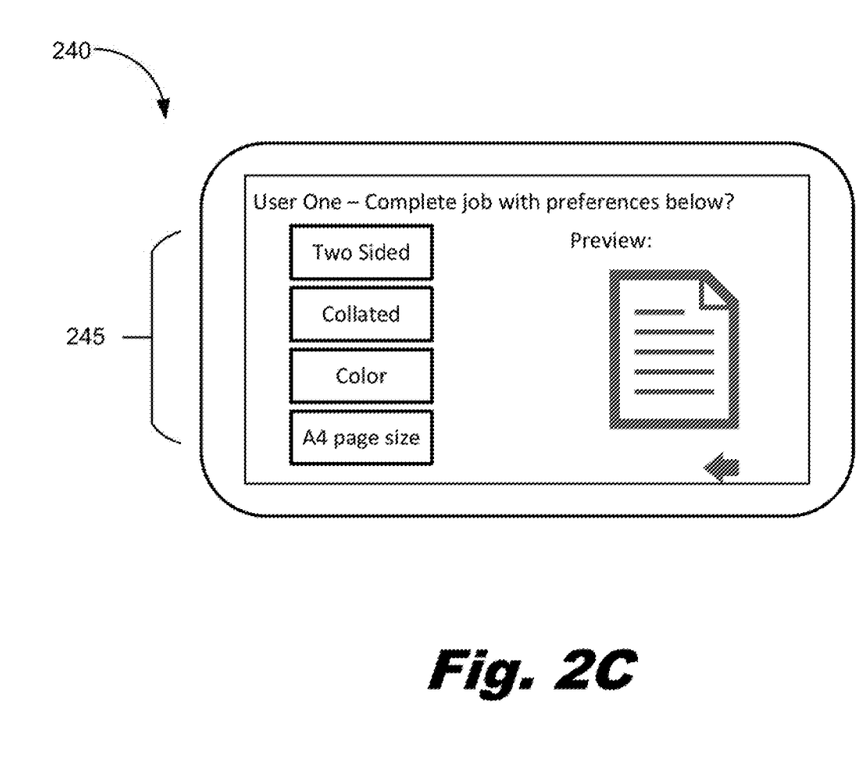

FIG. 2A-2C illustrates an example user interfaces 200, 220, and 240 that may be presented on a display of an image forming device. For example, the image forming device, may be one as described with reference to FIG. 1 above. For example, the user interface may be generated by a user interface generator 136 based on information received from image delivery system 110 as further described herein.

FIG. 2A illustrates an example user interface 200 that shows a set of users 205 that have been selected for display by the image forming device. For example, the set of users 205 may be selected as having a threshold predicted intent to use the image forming device, based on proximity to the image forming device, based on most recent to authenticate a beacon associated with the image forming device, or based on other criteria. The set may be determined by the image forming device or may be received from an image delivery system based on analysis of multiple user accounts and user devices by the image delivery system 110. The user interface 200 also includes an option 210 for a user to access and use the image forming device without being listed in the set of users 205. For example, a user may not have a device that enables authentication through the processes discussed above with respect to FIG. 1 and may enter credentials into the image forming device for authentication. In some examples, a user may still have an account enabling personalized user interface generation as shown in FIG. 2B.

FIG. 2B illustrates an example user interface 220 that is personalized for a user based on selection and authentication of the user. As shown, user one has been identified and a set of actions and preferences 225 are preset for the user based on user preferences and available actions. In some examples, there are additional authentication actions performed by the image forming device or user device between the transition from FIG. 2A to FIG. 2B. For example, the selected user of the set of users 205 may receive a notification on a corresponding user device to authenticate the user. In other security schemes, one or more other sets of credentials, actions, security questions, or the like may be used to further authenticate the user. The language of the user interface 220 and the actions and settings 225 provided in the personalized user interface may be provided based on settings and preferences of the user account stored on the image forming device or stored at a remote location such as an image delivery system.

FIG. 2C illustrates an example user interface 240 showing further personalization of user interfaces for a user. In the example, a user has selected a print action for the image forming device, but similar personalization may be performed for other actions selectable by a user. For example, scanning, faxing, copying, or other actions may have similar personalization. The settings and preferences 245 illustrated in example user interface 240 include two sided, collated, color, and paper size. In various examples, fewer, additional, or different settings and preferences may be provided in the user interface. Those settings and preferences may be provided based on settings and preferences of the user account stored on the image forming device or stored at a remote location such as an image delivery system.

Figure 3:
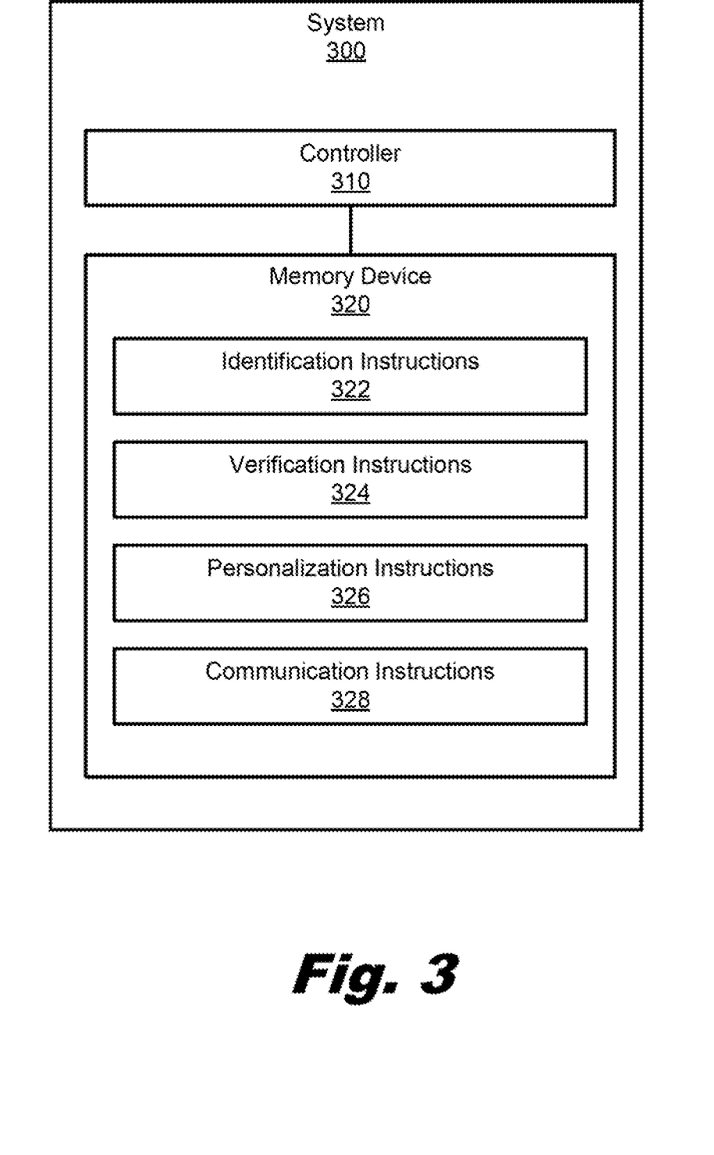
FIG. 3 illustrates a block diagram of a system to generate personalized user interfaces according to examples.

FIG. 3 is a block diagram of an example system 300 to generate personalized user interfaces by an image forming device. The system may be part of a remote system, such as an image delivery system 110 as described with reference to FIG. 1, that coordinates authentication and personalization for user accounts accessing the system or image forming apparatus. In some examples, one or more components of system 300 may be part of the image forming apparatus. System 300 may include at least one computing device that is capable of communicating with at least one remote system. In the example of FIG. 3, system 300 includes a controller 310 couple to a memory device 320. Although the following descriptions refer to a single processor and a single computer-readable medium, the descriptions may also apply to a system with multiple processors and computer-readable mediums. In such examples, the instructions may be distributed (e.g., stored) across multiple computer-readable mediums and the instructions may be distributed (e.g., executed by) across multiple processors.

Processor 310 may be a central processing unit (CPUs), a microprocessor, and/or other hardware devices suitable for retrieval and execution of instructions stored in memory device 320. In the example system 300, controller 310 may receive and execute identification instructions 322, verification instruction 324, personalization instructions 326, and communication instructions 328, for installing code package variants. As an alternative or in addition to retrieving and executing instructions, controller 310 may include an electronic circuit comprising a number of electronic components for performing the functionality of an instruction in memory device 320. With respect to the executable instruction representations (e.g., boxes) described and shown herein, it should be understood that part or all of the executable instructions and/or electronic circuits included within a particular box and/or may be included in a different box shown in the figures or in a different box not shown.

Memory 320 may be any electronic, magnetic, optical, or other physical storage device that stores executable instructions. Thus, memory device 320 may be, for example, Random Access Memory (RAM), an Electrically-Erasable Programmable Read-Only Memory (EEPROM), a storage drive, an optical disc, and the like.

Identification instructions 322 stored on memory device 320 may, when executed by the controller 310, cause the controller 310 to identify a user account based on received information from a user device. For example, the user device may provide an account identification associated with a user, profile information of the user, a device identification of the user device, or other information about the user.

Verification instructions 324 stored on memory device 320 may, when executed by the controller 310, cause the controller 310 to verify or authenticate a user account based on the received information. The system 300 may also have received beacon information associated with an image forming device. The beacon information may include a device identification of the image forming device as well as a token associated with the image forming device. The token may be transmitted by the user device to the system which then compares it to a record of a token received by the system from the image forming device. Based on the comparison, and potentially other information about the user device and the image forming device, the system 300 verifies the user account.

The personalization instructions 326 stored on memory device 320 may, when executed by the controller 310, cause the controller 310 to determine user preferences and pending action of the user account. The system may store personalized setting and preferences for the user account or may receive such personalization information from the user device as part of the received information transmitted from the user device.

The communication instructions 328 stored on memory device 320 may, when executed by the controller 310, cause the controller 310 to provide user preferences to the image forming device to generate a personalized user interface. For example, the system may transmit a set of settings and preferences associated with the user account that are applicable to the image forming apparatus. In some examples, pending actions, such as items in the user account's print queue may also be provided to the image forming apparatus to enable fast access to begin a print job by the user. In some examples, the system 300 may also provide an image forming device with a list of documents stored in a document repository that may be transmit to the image forming device upon request to print or otherwise interact with by the user. The various personalization items discussed may then be presented by the image forming device as a personalized user interface on a display. In various examples, the memory device 320 may include additional sets of instructions to cause the controller 310 to perform additional functions.

Figure 4:
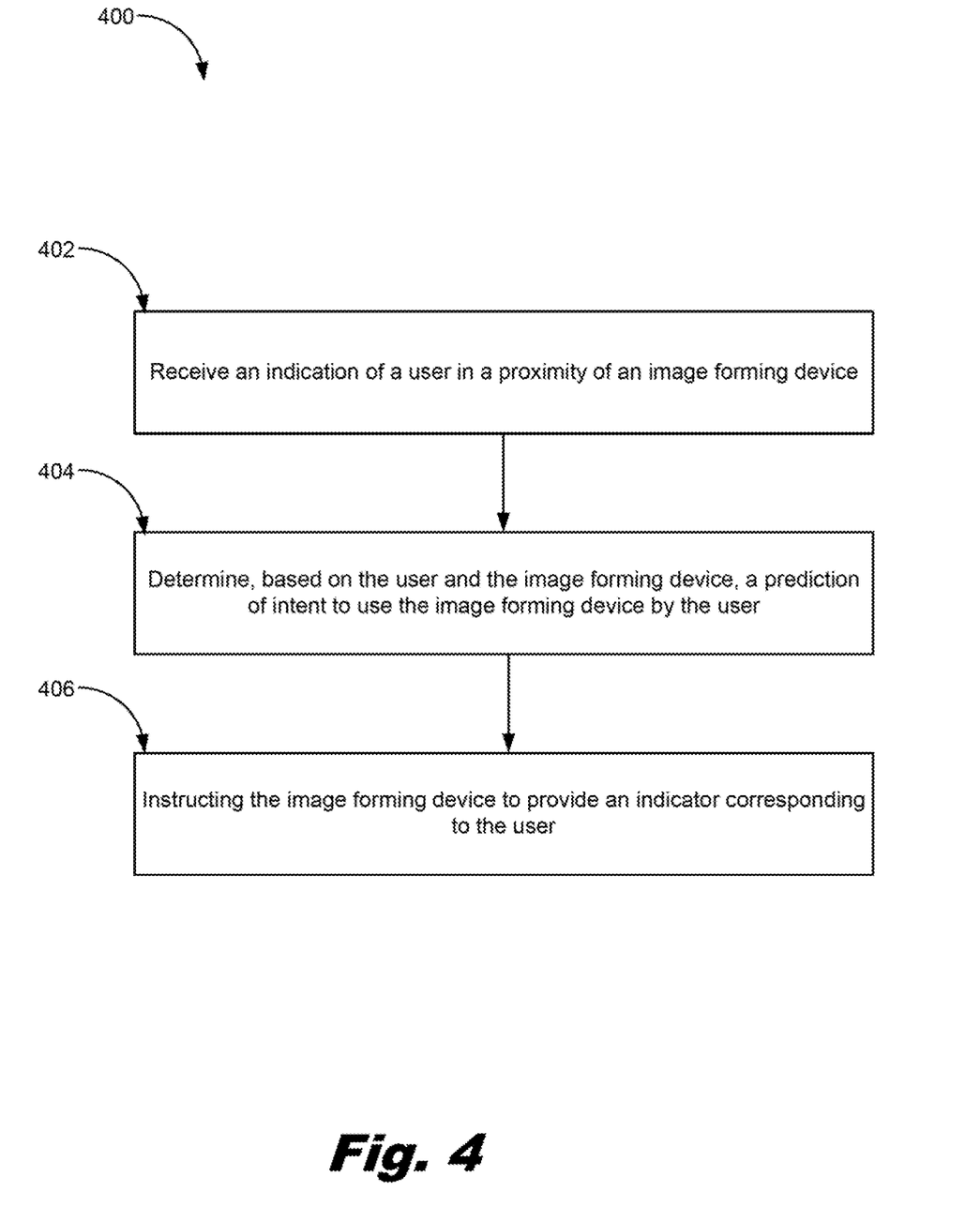
FIG. 4 is a flow diagram outlining an example method of personalized user interface generation according to examples.

FIG. 4 illustrates an example flow diagram 400 that may be performed by a personalization system to provide a personalized user interface. For example, the flow diagram may be performed by systems as described with reference to FIG. 1. In various examples, the processes described in reference to flow diagram 400 may be performed in a different order or the flow diagram may include fewer or additional blocks than are shown in FIG. 4.

Beginning in block 402, the personalization system receives an indication of a user device in a proximity of an image forming device. The indication of the user may be received from the user device and include user account information associated with a user of the user device as well as beacon information including a token and device identification that the user device received from the image forming device.

In block 404, the personalization system determines based on the user device and the image forming device, a prediction of intent to use the image forming device by a user account associated with the user device. For example, the prediction of intent may be based on user device location, usage history of the image forming device, pending actions of the user account, or the like. The prediction may be a ranking (e.g., high, medium, or low), a probability, or another indication of a predicted likelihood that a user will access the image forming device.

In block 406, the personalization system instructs the image forming device to provide an indicator corresponding to the user account in response to determining the prediction is greater than a threshold. The threshold may be determined based on other user devices in proximity of the image forming device. For example, a threshold may be set to include a set number of users with the highest likelihood of using the image forming device. The threshold may also be set by proximity of user devices to the image forming device or based on a combination of features of various user devices. In some examples, the personalized user interface includes a personalized security interface for the user account. For example, the personalized security interface may be based on security settings of the user account stored in the personalization system or received from the user device.

In addition to the processes discussed, a personalization system may also provide addition features such as determining user settings to generate a personalized interface for the user account, providing a set of prefilled preferences associated with the user in response to the indication of a selection of a user interface element, providing access various actions such as personalized tasks, network documents of the user account, pending actions for the user account, or other personalized actions for the user account.

It will be appreciated that examples described herein can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are examples of machine-readable storage that are suitable for storing a program or programs that, when executed, implement examples described herein. In various examples other non-transitory computer-readable storage medium may be used to store instructions for implementation by processors as described herein. Accordingly, some examples provide a program comprising code for implementing a system or method as claimed in any preceding claim and a machine-readable storage storing such a program.

The features disclosed in this specification (including any accompanying claims, abstract and drawings), and/or the operations or processes of any method or process so disclosed, may be combined in any combination, except combinations where at least some of such features and/or processes are mutually exclusive.

Each feature disclosed in this specification (including any accompanying claims, abstract, and drawings), may be replaced by alternative features serving the same, equivalent or similar purpose, unless expressly stated otherwise. Thus, unless expressly stated otherwise, each feature disclosed is an example of a generic series of equivalent or similar features.

The invention claimed is:

1. A method comprising:
   receiving an indication of a user device in a proximity of an image forming device;
   determining, based on the user device and the image forming device, a prediction of intent to use the image forming device by a user account associated with the user device; and
   in response to determining the prediction is greater than a threshold, instructing the image forming device to provide an indicator corresponding to the user account, the indicator including a ranking among other user accounts based on the prediction of intent to use the image forming device.

2. The method of claim 1, wherein the prediction of intent is based on at least one of user device location, usage history of the image forming device, or pending actions of the user account.

3. The method of claim 1, further comprising determining the threshold based on other user devices in proximity of the image forming device.

4. The method of claim 1 further comprising:
   determining user settings to generate a personalized interface for the user account, wherein the indicator corresponding to the user account is the personalized interface.

5. The method of claim 4, wherein the personalized interface comprises a personalized security interface for the user account.

6. The method of claim 1, further comprising,
   receiving an indication of selection of the indicator by the user account; and
   providing a set of prefilled preferences associated with a user in response to the indication of the selection.

7. The method of claim 1, further comprising,
   receiving an indication of selection of the indicator; and
   providing access to at least one of personalized tasks, network documents, or pending actions.

8. The method of claim 1, further comprising determining the threshold based on a maximum number of users to display on the image forming device.

9. A system comprising:
   a memory device to store instructions; and
   a controller coupled to the memory device to execute instructions stored thereon, the controller to:
     identify a user account based on received information from a user device;
     verify the user account based on the received information from the user device and beacon information of an image forming device;
     determine user preferences and pending actions of the user account; and
     provide user preferences to the image forming device to generate a personalized user interface.

10. The system of claim 9, wherein the controller is further to generate a prediction of user account of intent to use the image forming device based on at least one of user device location, usage history of the image forming device, or the pending actions of the user account.

11. The system of claim 9, wherein the controller is further to generate a user interface comprising a set of user accounts in proximity of the image forming device, wherein the set of user accounts is to be displayed in the user interface based on a predicted intent to use the image forming device by the set of user accounts.

12. The system of claim 9, wherein the controller is further to provide a set of security settings associated with the user account to the image forming device to generate a personalized security interface.

13. The system of claim 9, wherein the controller is further to:
    receive an indication of selection of an indicator by the user account; and
    provide a set of prefilled preferences associated with the user account in response to the indication of the selection.

14. The system of claim 9, wherein the controller is further to:
    generate a prediction of user account of intent to use the image forming device based on the beacon information;
    wherein the beacon information includes a most recent authenticated beacon associated with the image forming device.

15. A non-transitory computer-readable storage medium comprising a set of instructions executable by a processor to:
    periodically generate beacon information including a token and device identification of an image forming apparatus;
    receive an indication of user devices and an associated set of user accounts in a proximity of the image forming apparatus;
    generate a user interface indicating the set of user accounts; and
    in response to selection of a selected user account of the set of user accounts, generate a personalized user interface for the selected user account.

16. The non-transitory computer-readable storage medium of claim 15, wherein the instructions further cause the processor to:
    receive a preference of a security setting associated with the selected user account; and
    request authentication of the user account based on the security setting.

* * * * *